UNITED STATES PATENT OFFICE.

JEREMIAH S. SMITH, JR., OF JACKSONVILLE, FLORIDA.

FIBER FOR THE MANUFACTURE OF BRUSHES AND FOR OTHER PURPOSES.

SPECIFICATION forming part of Letters Patent No. 251,308, dated December 20, 1881.

Application filed September 13, 1881. (Specimens.)

*To all whom it may concern:*

Be it known that I, JEREMIAH S. SMITH, Jr., of Jacksonville, in the county of Duval and State of Florida, have invented a new and Improved Fiber for the Manufacture of Brushes and for other Purposes; and I do hereby declare that the following is a full, clear, and exact description of the same.

The object of my invention is to provide an improved vegetable fibrous material for use in the manufacture of brushes of various descriptions. To this end I have made experiments, and as the result thereof have discovered that the fiber of the cabbage-palmetto, when properly treated to remove other growth, fulfills all the essential conditions required.

My preferred method of reducing such fiber to the desired condition is as follows: I take top of cabbage palm or palmetto, cut it into pieces of suitable size, and place them in a vat containing an aqueous solution of soda. Steam is then introduced to boil the liquid, and the palmetto is allowed to remain therein until its fibers will separate easily. It is then removed from the liquid and crushed between rollers, after which it is run through hackles, by which means the fiber is thoroughly separated from the other growth. It is next placed in a drying-room, and when thoroughly dry is cleansed of dust and other foreign matters by means of brushes. The fiber is then ready for use, and in the manufacture of brushes is used in the same manner as other materials ordinarily employed for the purpose. Said fiber may be furnished at small cost, and being very tough, strong, and durable, yet flexible, it constitutes a superior substitute for tampico, rice-root, broom-corn, &c.

What I claim is—

As a new and improved article of manufacture, the fiber of the palmetto deprived of other adhering fibrous growths, for use in the manufacture of brushes, as specified.

JEREMIAH S. SMITH, JR.

Witnesses:
GEO. D. WALKER,
C. SEDGWICK.